US008612559B2

(12) United States Patent
Kuik

(10) Patent No.: US 8,612,559 B2
(45) Date of Patent: Dec. 17, 2013

(54) CENTRAL CONTROLLER FOR COORDINATING MULTICAST MESSAGE TRANSMISSIONS IN DISTRIBUTED VIRTUAL NETWORK SWITCH ENVIRONMENT

(75) Inventor: Timothy J. Kuik, Lino Lakes, MN (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 12/331,792

(22) Filed: Dec. 10, 2008

(65) Prior Publication Data

US 2010/0146093 A1   Jun. 10, 2010

(51) Int. Cl.
  *G06F 15/177* (2006.01)
(52) U.S. Cl.
  USPC .......................................................... 709/221
(58) Field of Classification Search
  USPC ......... 709/203, 204, 206, 207, 219, 220, 221, 709/223, 224, 225, 227, 228, 229, 232, 238, 709/244, 245
  See application file for complete search history.

(56) References Cited

U.S. PATENT DOCUMENTS

| 5,519,707 | A | 5/1996 | Subramanian et al. | |
|---|---|---|---|---|
| 7,478,173 | B1 * | 1/2009 | Delco | 709/250 |
| 2002/0165920 | A1 | 11/2002 | Keller-Tuberg | |
| 2006/0083253 | A1 * | 4/2006 | Park et al. | 370/401 |
| 2006/0114903 | A1 * | 6/2006 | Duffy et al. | 370/390 |
| 2006/0242311 | A1 | 10/2006 | Mai et al. | |
| 2007/0156972 | A1 * | 7/2007 | Uehara et al. | 711/146 |
| 2007/0280243 | A1 * | 12/2007 | Wray et al. | 370/392 |
| 2008/0225875 | A1 | 9/2008 | Wray et al. | |

FOREIGN PATENT DOCUMENTS

WO    WO 2010/068594    6/2010

OTHER PUBLICATIONS

Notification of Transmittal of the International Search Report and the Written Opinion of the International Searching Authority, or the Declaration (1 page), International Search Report (4 pages), and Written Opinion of the International Searching Authority (8 pages) mailed Apr. 20, 2010 for International Application No. PCT/US2009/067008.
PCT Jun. 23, 2011 International Preliminary Report on Patentability from International Application No. PCT/US2009/067008; 9 pages.
EPO Jul. 19, 2011 EP Communication from European Application 0983247; 2 pages.
EPO Jan. 13, 2012 Response to EP Communication dated Jul. 19, 2011 from European Application 09832427; 11 pages.
PRC Apr. 1, 2013 SIPO First Office Action from Chinese Application No. 200980137026.8; 14 pages.
PRC Aug. 16, 2013 Response to Apr. 1, 2013 SIPO First Office Action from Chinese Application No. 200980137026.8 (English translation of Claims only).

* cited by examiner

*Primary Examiner* — Barbara Burgess
(74) *Attorney, Agent, or Firm* — Patent Capital Group

(57) ABSTRACT

A centralized control processor provides a unified management mechanism for multiple multicast switches or servers running virtual switches that is also capable of sending query messages based upon a subset of ports.

17 Claims, 2 Drawing Sheets

CENTRAL CONTROLLER FOR COORDINATING MULTICAST MESSAGE TRANSMISSIONS IN DISTRIBUTED VIRTUAL NETWORK SWITCH ENVIRONMENT

I. FIELD OF THE INVENTION

The present invention relates generally to coordinating multicast group messaging in a distributed virtual network switch environment.

II. BACKGROUND OF THE INVENTION

Multicast groups enable several users of, e.g., wireless computers (colloquially referred to as "hosts") to access the same Internet video simultaneously with each other. Users must send messages to join multicast groups to receive the desired group packets, and provision must be made to eliminate certain messages to users who leave multicast groups. One example protocol for attending to these chores is known as Internet Group Management Protocol (IGMP).

The above processes depend on identifying servers of multicast packets and network switches between the servers and the users. As understood herein, when virtual machines are employed as the servers and when the servers connect to the network using virtual switches, such recognition does not necessarily occur, resulting in flooding messages to nodes that do not need them and potentially failing to deliver messages to nodes that should receive them.

BRIEF DESCRIPTION OF THE DRAWINGS

The details of the present invention, both as to its structure and operation, can best be understood in reference to the accompanying drawings, in which like reference numerals refer to like parts, and in which.

DESCRIPTION OF EXAMPLE EMBODIMENTS

Overview

A system includes at least first and second computer servers. At least first and second virtual machines (VM) are implemented by the first server and at least a third VM is implemented by the second server. A first virtual switch on the first server communicates with the first and second VM and with a network. Likewise, a second virtual switch on the second server communicates with the third VM and the network. A centralized control processor communicates with both servers to coordinate multicast messaging at least within the servers.

In some embodiments the centralized control processor provides a unified view of the virtual switches and the VMs. In example embodiments the centralized control processor causes a third server to which the first VM is to be migrated to send a join report to join a multicast group to which the first VM belongs if the third server is not already a member of the multicast group, prior to migrating the first VM to the third server.

In the example case in which the third VM is a member of a first multicast group and the first and second VMs are not members of the first multicast group, the first virtual switch receives no multicast messages addressed to the first multicast group.

In some implementations the centralized control processor causes join and exit reports from the first and second servers to be routed only to components known to be routers or switches and not to VMs on the servers that are not members of a multicast group that is the subject of the reports. If desired, multicast messages may be forwarded only along links leading to VMs that are members of a multicast group which is the subject of the multicast messages thereby reducing unnecessary flooding of the reports. In the example case of a server with no VMs associated with a particular multicast group, the virtual switch of the server does not receive any multicast packets addressed to the particular multicast group.

In another embodiment a method includes providing plural local switches, and providing a centralized control processor communicating with the local switches. The method also includes using the centralized control processor to prevent at least a first local switch from receiving multicast messages not addressed to any entity behind the first local switch.

In another embodiment an apparatus includes a centralized control processor communicating with plural servers. Each server is capable of executing at least one virtual machine and a respective switch connecting the VM to a network. The centralized control processor coordinates multicast messaging between the servers and the network.

Example Embodiments

Figure 1:
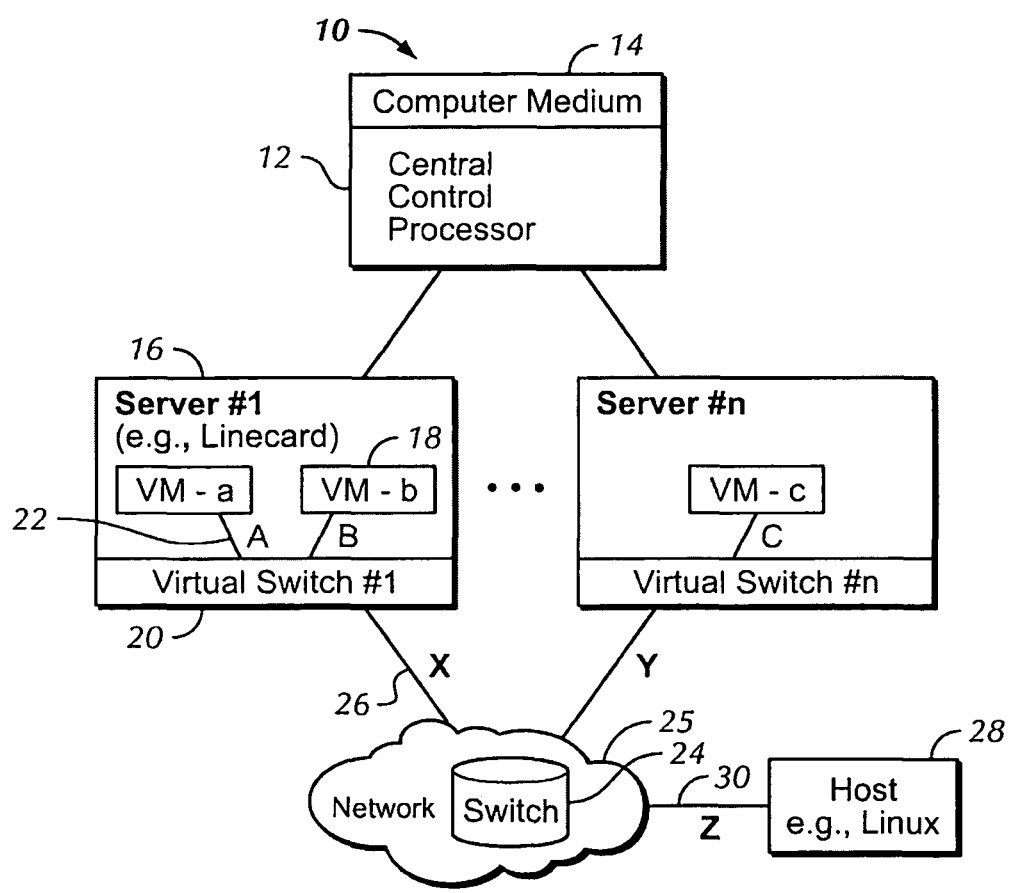
FIG. 1 is a block diagram of an example system in accordance with present principles.

Referring initially to FIG. 1, a component such as a server or virtual machine 10 executes a manager module that in one example implementation may be a central control processor 12, typically stored on a tangible computer-readable medium 14 such as disk-based storage or solid state storage, in accordance with description below. Additional switches, hosts, and servers in addition to those shown in FIG. 1 may be included, it being understood that FIG. 1 is a simplified diagram for illustration only. Some embodiments may include more network devices (and network devices of different types, such as routers).

The data coordinated by the central control processor 12 logically grouped into one or more messages. The term "message" refers to a logical grouping of information sent as a data unit over a transmission medium. Messages may include header and/or trailer information that surrounds user data contained in the data unit. A "message" may include a cell, datagram, frame, packet, segment, or any other logical group of information.

The example non-limiting switches, servers, computers, and hosts may include various interfaces that may include physical interfaces (e.g., on a line card internal to a switch) and/or logical interfaces (also referred to as virtual interfaces). For example, a physical interface such as but not limited to a trunk interface that receives messages for several Virtual Local Area Networks (VLAN) can include several logical interfaces, one for each VLAN. Alternatively, a logical interface can be an interface that is located on a physically separate intermediate network device, coupled between the switch and a group of hosts, that passes messages sent by the hosts to the switch without making forwarding decisions. Furthermore, the interfaces may be organized in various ways. For example, in some embodiments, interfaces can be organized hierarchically. In one such embodiment, physical interfaces within a switch reside at the top level of the hierarchy. A physical interface to devices in several different VLANs can include several VLAN-specific logical interfaces that are organized beneath the physical interface in the switch's interface hierarchy.

The central control processor 12 communicates with plural computer-implemented servers 16, typically over a local area network. While only two servers are shown, more (e.g., thirty two, sixty four, etc.) may be provided. Each server 16 can be implemented by a computer colloquially known as a "linecard" and each server 16 may execute a hypervisor for coordinating the operation of one or more virtual machines (VM) 18 on the server 16. For example, the server 16 on the left in FIG. 1 implements two VM (labeled "VM-a" and "VM-b") while the server on the right in FIG. 1 implements a single VM ("VM-c"). Each VM 18 is a virtual machine in that, while being implemented in software, the VM operates on the associated server 16 as though the VM were a hardware-implemented machine.

As shown, each server 16 can include a respective virtual switch 20, with each VM 18 of the server 16 communicating with the respective virtual switch 20 of the server 16 over a respective virtual upstream link 22, such as a virtual ethernet. Thus, as shown in FIG. 1, "VM-a" communicates with the virtual switch 20 of the left-hand server 16 over a virtual upstream link labeled "A", whereas "VM-b" communicates with the virtual switch 20 of the left-hand server 16 over a virtual upstream link labeled "B". The virtual switches 20 are virtual switches in that they are implemented by software within the associated server 16, although hardware features in a network interface card (NIC) may also be used. Together, the virtual switches 20 under the central control processor 12 establish a distributed virtual switch. It is to be understood that present principles also apply to managing multicast message forwarding in the case of a group of local physical switches, as well as to the case shown in which the local switches are virtual switches 20.

FIG. 1 shows that each virtual switch 20 communicates with a hardware-implemented switch 24 in a network 25 such as the Internet over a respective server-to-switch upstream link 26. Thus, the virtual switch 20 of the left hand server 16 in FIG. 1 communicates with the hardware-implemented switch 24 over an upstream link labeled "X" while the virtual switch 20 of the right hand server 16 in FIG. 1 communicates with the hardware-implemented switch 24 over an upstream link labeled "Y". The hardware-implemented switch 24 may be, without limitation, a network router, but it may also be implemented in software.

In turn, the hardware-implemented switch 24 communicates with one or more host computers 28 (only one host shown for clarity) over respective switch-to-host upstream links 30. The switch-to-host upstream link 30 in FIG. 1 is labeled "Z". The hosts 28 may be, without limitation, Linux-operating computers such as wireless user computers whose users desire to receive multicast packets such as multicast audio-video packets from one or more of the server VM 18. The hosts 28 may also include servers or other computers that originate multicast messages.

In accordance with IGMP, when hosts join a multicast group, they transmit join messages along upstream links to potential multicast servers, and likewise when hosts exit multicast groups they can either transmit exit messages or upstream components (referred to as "queriers") may periodically transmit queries to determine which hosts might have exited the multicast group. According to present principles, the architecture of FIG. 1 and logic of FIG. 2 maybe used to reduce message flooding to/from hosts and components that are not involved in the multicast group.

In some embodiments, the hosts 28 and servers 16 each include one or more of various types of computing devices with associated computer readable storage media such as solid state storage or disk-based storage. For example, the hosts and/or servers can each be a personal computer, a workstation, an Internet server, a network appliance, a handheld computing device such as a cell phone or PDA (Personal Data Assistant), or any other type of computing device. The hosts and servers can also be implemented in software processes executing on such computing devices. The hosts and servers can each be directly or indirectly connected to the switch 24 through one or more intermediate network devices such as routers (as well as one or more other switches or other network devices).

Figure 2:
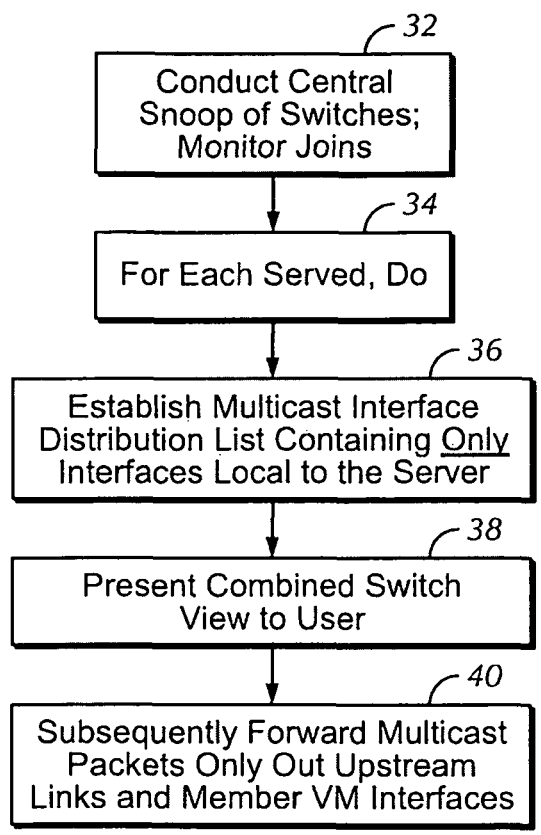
FIG. 2 is a flow chart of general example logic.

Now referring to FIG. 2, at block 30 the central control processor 12 in cooperation with the virtual switches 20 conducts a central snoop of all upstream switches, including the virtual switches 20. The central control processor 12 also monitors for join messages from various hosts that are received by the VM 18 of the servers 16.

At block 34, for each server 16 the central control processor 12 moves to block 36 to establish a multicast interface distribution list (which may be implemented by a lookup table associating addresses with multicast group IDs) containing only interfaces that are local to the server. For example, the list for the left hand server 16 in FIG. 1 would indicate that VM-a communicates with the associated virtual switch 20 over the virtual Ethernet "A" and that VM-b communicates with the associated virtual switch 20 over the virtual Ethernet "B". The list for the left-hand server 16 may also indicate that the associated virtual switch 20 communicates with the physical switch 24 over the server-to-switch upstream link "X".

If desired, at block 38 a combined switch view of all links and VM under the central control processor 12 may be presented by the central control processor 12 to a user on, e.g., a computer monitor, so that a user may see the combined switch view even though the list for each server is individualized to that server.

IGMP join/exit reports are used in accordance with IGMP principles to enroll and disenroll components including the servers and VMs discussed above in multicast groups. In accordance with IGMP principles, join reports and exit (or "leave") reports are sent along upstream links to upstream components known to be routers/switches, e.g., the switch 24. For instance, if VM-a originates a join report, the central control processor 12 intercepts the VM-a join report on virtual link "A" and sends out the join report along the server-to-switch link "X" and no other links, e.g., no join report is sent over the virtual link "B", since the VM-b is known by the central control processor 12 not to be a router or a switch. When the physical switch 24 receives the join report, it then forwards the report along the switch-to-host link "Z". Thus, in the case of the system of FIG. 1, the central control processor 12 monitors for and is aware of join and exit reports issued by the VMs 18, so the processor 12 knows which VMs belong to which multicast groups.

Also, in the case in which VM-c issues a join report, the join report is sent along the right hand server-to-switch link "Y", with the physical switch 24 then forwarding the join along both links "X" (to the VM-a) and "Z" (to the host 28) to thereby establish that the right-hand server in FIG. 1 should receive, on behalf of the VM-c, messages addressed to the multicast group that was the subject of the join report from VM-c. Furthermore, the left hand virtual switch 20 in FIG. 1 does not re-send the join back out along the server-to-switch link "X" since such reports are not sent back along the link of origination or from one pNIC to another pNIC.

As discussed further below, it is sometimes desirable to "migrate" a VM 18 from one server 16 to another server 16. In such as case, if the server 16 to which the VM is to be migrated is not enrolled in a multicast group to which the VM belongs, the server 16 can be caused by the central processor 12 (since it has a unified central view of all servers 16 under its purview) to issue the requisite join reports along upstream links such that when the VM 18 arrives at the new server 16, it will immediately be able to receive packets addressed to the multicast group to which it belongs.

Subsequently, at block 40, using the lists above and as more fully illustrated below using examples, multicast messages are forwarded only along links leading to VMs that are members of the particular group which is the subject of the messages, thereby limiting unnecessary flooding of multicast packets to all VMs on the server. In the case of servers 16 with no VMs associated with a particular multicast group, the virtual switch 20 of the server 16 does not receive any multicast packets addressed to the particular multicast group.

As an example, suppose VM-a and VM-c join a multicast group along with the host 28. Because the central control processor 12 monitors for such joins, the central control processor 12 is aware of the joins. Accordingly, when the left-hand server 16 in FIG. 1 receives multicast messages for VM-a, it sends those messages over the virtual link "A", while unnecessary transmission of multicast packets over the virtual link "B" to the otherwise not-enrolled VM-b is avoided.

Furthermore, because the central control processor 12 has a central view of all servers under its purview, it can migrate a VM 18 from one server to another so that, for instance, VMs in the same multicast group are concentrated on a single server 16 and, hence, consume only a single server-to-switch link 26 for multicast traffic purposes such as join and exit reporting purposes. As mentioned above, the server to which a VM is to be migrated can be enrolled, prior to VM migration, in multicast groups to which the VM belongs such that as soon as the VM "arrives" at the new server it immediately begins to receive appropriate multicast packets.

While the particular CENTRAL CONTROLLER FOR COORDINATING MULTICAST MESSAGE TRANSMISSIONS IN DISTRIBUTED VIRTUAL NETWORK SWITCH ENVIRONMENT is herein shown and described in detail, it is to be understood that the subject matter which is encompassed by the present invention is limited only by the claims.

What is claimed is:

1. A system comprising:
a centralized control processor configured to conduct a central snoop of upstream switches and to monitor for join messages, from hosts, that are received by virtual machines (VMs) of servers, the centralized control processor further configured to communicate with first and second computer servers, wherein first and second VMs are implemented by the first server and a third VM implemented by the second server, wherein incoming multicast messages received by the first server are communicated to a first virtual switch, which is associated with the first server, if they include a destination address associated with the first VM or the second VM, wherein the centralized control processor is configured to evaluate incoming join messages to be received by the first and second VMs, wherein, prior to migrating the first VM to a third server, the centralized control processor causes the third server to send a join report to join a multicast group to which the first VM belongs if the third server is not already a member of the multicast group, and wherein join/exit reports are used to enroll and disenroll the first and second servers and the first and second VMs into multicast groups, and wherein the join/exit reports are sent in a unidirectional fashion in one direction on a link of origination and not sent in an opposite direction on the link of origination.

2. The system of claim 1, wherein the centralized control processor provides a unified view of the virtual switches and the VMs.

3. The system of claim 1, wherein if the third VM is a member of a first multicast group and the first and second VMs are not members of the first multicast group, the first virtual switch receives no multicast messages addressed to the first multicast group.

4. The system of claim 1, wherein the centralized control processor causes join and exit reports from the first and second servers to be routed only to components known to be routers or switches and not to VMs on the servers that are not members of a multicast group that is the subject of the reports.

5. The system of claim 1, wherein multicast messages are forwarded only along links leading to VMs that are members of a multicast group which is the subject of the multicast messages thereby reducing unnecessary flooding of packets.

6. The system of claim 5, wherein in the case of a server with no VMs associated with a particular multicast group, the virtual switch of the server does not receive any multicast packets addressed to the particular multicast group.

7. The system of claim 1, wherein the first VM originates a first join report and the first join report is communicated downstream to a host and wherein the third VM originates a second join report and the second join report is communicated to the host and to the first computer server.

8. A method comprising:
providing a centralized control processor communicating with a plurality of local switches; and
using the centralized control processor to prevent at least a first local switch from receiving multicast messages not addressed to any entity behind the first local switch, wherein the centralized control processor is configured to conduct a central snoop of upstream switches and to monitor for join messages, from hosts, that are received by virtual machines (VMs) of servers, wherein the centralized control processor is configured to communicate with first and second computer servers, wherein first and second VMs are implemented by the first server and a third VM is implemented by the second server, wherein incoming multicast messages received by the first server are communicated to a first virtual switch, which is associated with the first server, if they include a destination address associated with the first VM or the second VM, the centralized control processor further configured to evaluate incoming join messages to be received by first and second VMs associated with a particular server, wherein, prior to migrating the first VM to a third server, the centralized control processor causes the third server to send a join report to join a multicast group to which the first VM belongs if the third server is not already a member of the multicast group, and wherein join/exit reports are used to enroll and disenroll the particular server and the first and second VMs into multicast groups, and wherein the join/exit reports are sent in a unidirectional fashion in one direction on a link of origination and not sent in an opposite direction on the link of origination.

9. The method of claim 8, wherein the switches are virtual switches.

10. The method of claim 8, wherein the centralized control processor provides a unified view of the virtual switches and the VMs.

11. The method of claim 8, wherein if the third VM is a member of a first multicast group and the first and second VMs are not members of the first multicast group, the first virtual switch receives no multicast messages addressed to the first multicast group.

12. The method of claim 8, wherein the centralized control processor causes join and exit reports from the first and second servers to be routed only to components known to be routers or switches and not to VMs on the servers that are not members of a multicast group that is the subject of the reports.

13. The method of claim 8, wherein multicast messages are forwarded only along links leading to VMs that are members of a multicast group which is the subject of the multicast messages thereby reducing unnecessary flooding of packets.

14. The method of claim 13, wherein in the case of a server with no VMs associated with a particular multicast group, the virtual switch of the server does not receive any multicast packets addressed to the particular multicast group.

15. An apparatus comprising:
a centralized control processor communicating with a plurality of servers each executing at least one virtual machine (VM) and a respective switch connecting VMs to a network, the centralized control processor coordinating multicast messaging between the servers and the network, wherein incoming multicast messages received by the servers are communicated to their respective switches if they include a destination address associated with the VMs coupled to the switches, wherein the centralized control processor is configured to conduct a central snoop of upstream switches and to monitor for join messages, from hosts, that are received by the VMs, the centralized control processor is further configured to communicate with first and second computer servers, wherein first and second VMs are implemented by the first server and a third VM is implemented by the second server, wherein incoming multicast messages received by the first server are communicated to a first virtual switch, which is associated with the first server, if they include a destination address associated with the first VM or the second VM, wherein, prior to migrating the first VM to a third server, the centralized control processor causes the third server to send a join report to join a multicast group to which the first VM belongs if the third server is not already a member of the multicast group, and wherein join/exit reports are used to enroll and disenroll the servers and the VMs into multicast groups, and wherein the join/exit reports are sent in a unidirectional fashion in one direction on a link of origination and not sent in an opposite direction on the link of origination.

16. The apparatus of claim 15, wherein the switches are virtual switches.

17. The apparatus of claim 16, wherein each switch is associated with a respective server, with at least first and second VMs being implemented by at least a first server and at least a third VM implemented by a second server and with a first virtual switch being associated with the first server and a second virtual switch being associated with the second server.

* * * * *